United States Patent [19] [11] 3,999,581
Eberle [45] * Dec. 28, 1976

[54] ACID FILLING METHOD AND APPARATUS FOR BATTERIES

[75] Inventor: William J. Eberle, Reading, Pa.

[73] Assignee: General Battery Corporation, Reading, Pa.

[ * ] Notice: The portion of the term of this patent subsequent to Jan. 27, 1993, has been disclaimed.

[22] Filed: July 28, 1975

[21] Appl. No.: 599,721

Related U.S. Application Data

[63] Continuation of Ser. No. 423,317, Dec. 10, 1973, Pat. No. 3,934,624.

[52] U.S. Cl. .................................. 141/1; 141/129; 141/238; 141/283
[51] Int. Cl.² .......................................... B65B 3/04
[58] Field of Search .............. 141/129, 1, 237, 238, 141/283, 284, 100, 9; 222/356, 357, 358; 164/336; 425/448; 136/162, 176; 193/35 A

[56] References Cited

UNITED STATES PATENTS

| 1,731,464 | 10/1929 | Kantor | 222/356 |
| 2,063,417 | 12/1936 | Wheat | 141/284 |
| 2,306,101 | 12/1942 | Zandt | 193/35 A |
| 2,791,246 | 5/1957 | Schmidt | 141/237 |
| 2,899,481 | 8/1959 | Kardorff | 136/162 |
| 3,404,713 | 10/1968 | Elford | 222/356 |
| 3,514,018 | 5/1970 | Petig et al. | 222/358 |
| 3,732,125 | 5/1973 | Stroh | 136/162 |

Primary Examiner—Houston S. Bell, Jr.
Attorney, Agent, or Firm—Frank J. Benasutti

[57] ABSTRACT

Batteries are moved by a conveyor to a predetermined position, and a plurality of nozzles attached to an adjustable filling assembly are lowered over the battery such that the nozzles mate with inlet ports of the battery cells. A ladling assembly which had been immersed in a tank of electrolyte is raised above the level of the nozzles, such that electrolyte flows from the ladling assembly through a plurality of hoses to the nozzles and thence into the battery cells.

18 Claims, 12 Drawing Figures

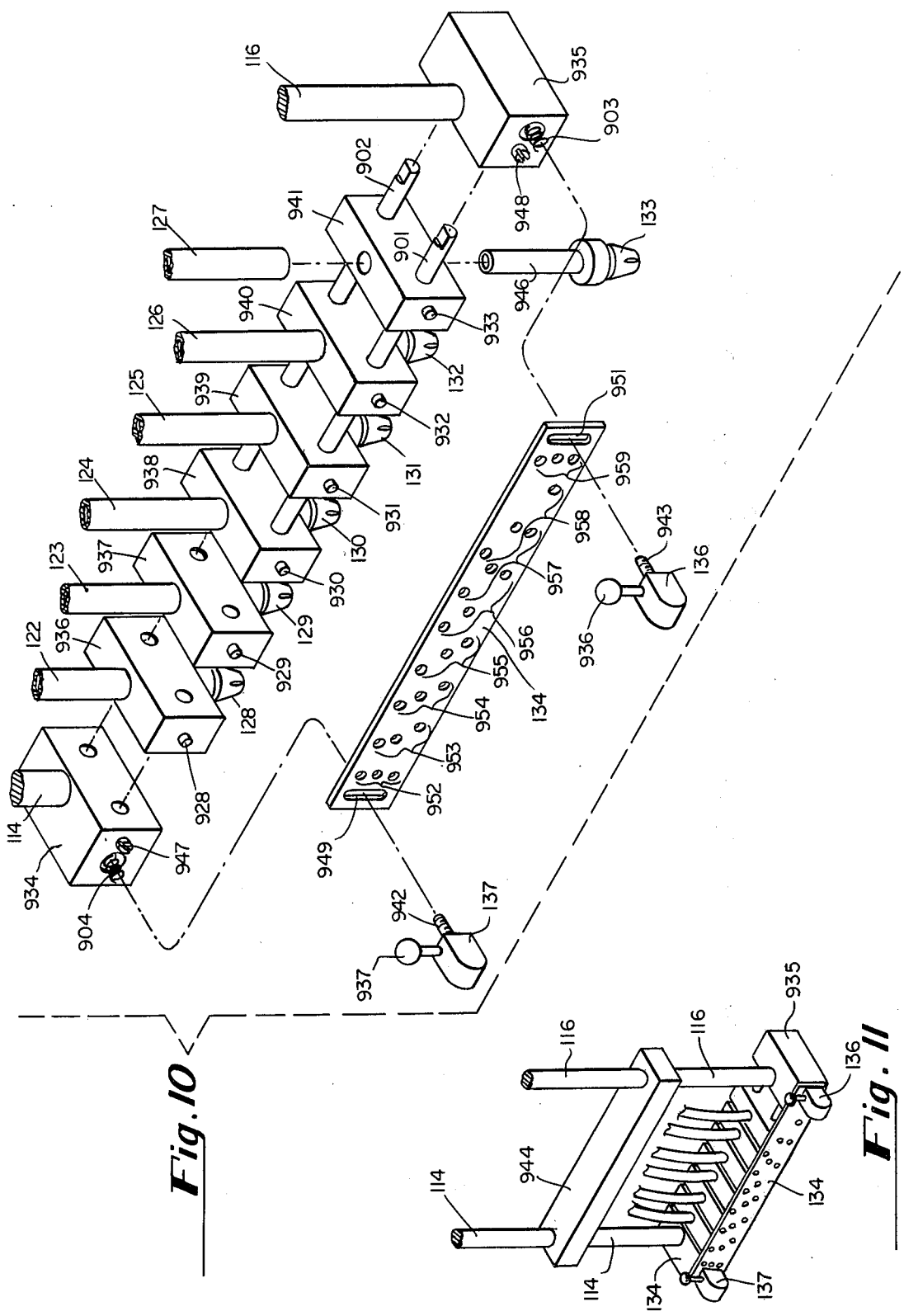

(A) ENTERING BATTERY 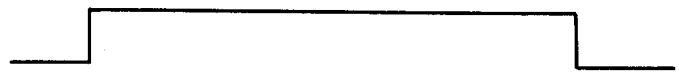
(B) PIVOT ROLLERS 159 and 167 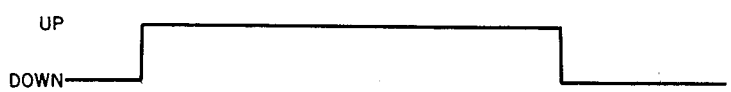
(C) AUTOMATIC TIMING OF FILL PROCESS 
(D) PIVOT ARMS 186 and 187 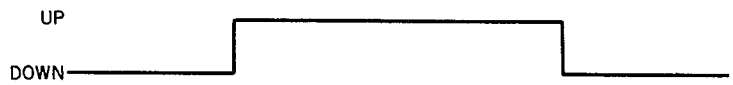
(E) OPERATE ASSEMBLY 113 
(F) OPERATE LADLING MEANS 
(G) ACID DRAIN TIMER 
(H) COUNTER 
*Fig. 12*

ACID FILLING METHOD AND APPARATUS FOR BATTERIES

This is a continuation of application Ser. No. 423,317 Filed Dec. 10, 1973, now U.S. Pat. No. 3,934,624.

BACKGROUND OF THE INVENTION

This invention relates to battery processing and manufacturing, and more particularly to methods and apparatus for filling batteries with electrolyte fluids.

In the manufacturing and processing of batteries, two general goals always are sought after. First, it is important for reasons of quality control and safety that the individual cells of the battery be filled with a proper amount of electrolyte fluid. Secondly, both in the acid filling operations and in other similarly constituted steps of the manufacturing process, it is desirable that the machinery involved be designed with substantial structural adaptability such that batteries of varying configuration and size may be efficiently processed thereby.

The safety and quality control problems associated with battery manufacturing processes are well-known. Typically, batteries are configured of multiple cells each having a separate inlet port for providing a predetermined amount of electrolyte fluid, such as acid, for reaction with the electrode plates in the respective cells. If a given cell is either overfilled or underfilled with acid, irregular electrical characteristics may result, with consequent damage either to the battery itself or to associated electrical apparatus driven by the battery. Similarly, the acid composition of most electrolyte fluids tends to produce gases which under certain circumstances may be explosive. In order, therefore, to yield a battery which is both safe and effective, it is important to ensure to as great a degree as possible that the battery cells will contain a proper amount of fluid.

It is also well-known that, depending upon the eventual end use for the batteries, the size and configuration thereof may vary widely. For example, the number of cells and the volume of each may vary considerably, and the location of inlet ports of the various cells will be correspondingly altered. Similarly, depending upon the situs of use of the battery, terminal posts may be located at disparate points on the battery top or bottom surfaces. In order to accomodate these variations in battery characteristics, a given machine should present reasonable adaptability not only as to the amount of volume coupled to the battery in a filling process, but also as to the location of the portions of the machine which actually make contact with the battery. For example, the number and location of nozzles for the filling process should be as adaptable as possible, with such adaptability being reasonably quick and simple and without requiring major overhaul of the processing machinery.

The prior art shows many attempts at realization of these general goals, but none is believed to be completely effective in any or all respects. For example, one class of filling apparatus involves the use of one or more pumps which transfer fluid from a receptacle tank into batteries. In addition to involving mechanical reliability problems, such an approach also requires rather sophisticated adjustment mechanisms in order to provide the volume adaptability required. Moreover, if a crimp or blockage occurs in a feed hose in such systems, many or all of the cells of the battery being filled will be subjected to overflow or underflow difficulties, with their consequent impairment of product quality and introduction of safety problems.

The present invention is therefore directed to achievement of the foregoing general objects insofar as possible.

SUMMARY OF THE INVENTION

The present invention substantially improves on battery filling and other manufacturing processes by providing a readily adaptable head mechanism which makes contact with the battery, and also by utilizing a gravity feed system for coupling fluid into the batteries which involves a high degree of accuracy and adaptability as to the volume so transferred. Once the batteries to be filled or otherwise processed are stationed in a predetermined position, template adjustable nozzles or the like are lowered downwardly over predetermined portions thereof. A ladling mechanism which has been immersed in the tank is raised to a level above the battery proper, and gravity flow causes the electrolyte to pass from the ladle down into the battery. By utilizing as a ladle a casing configured similarly to the battery itself, but which is tiltable to permit ladling of varying volumes of fluid, substantial adaptability and accuracy of filling is insured. Moreover, this combined gravity feed configuration permits the incorporation of other features which further enhance the operation and improve upon the achievement of the foregoing general objects.

In an illustrative embodiment, batteries move along a conveyor mechanism including a plurality of rollers. At strategic places on the conveyor, select ones of the rollers may be pivoted upwardly and above adjacent rollers, thereby providing a stop mechanism for positioning individual batteries. Once the batteries are so positioned, pivotable arms move upwardly between the rollers and lock the battery in a position as desired. Located vertically movable above the battery is an assembly including a plurality of nozzles slidably mounted on rails but which may be fixed in a variety of desired positions by means of an overlying template. Once the nozzle assembly is lowered such that the nozzles themselves mate with corresponding inlet ports of the battery to be filled, a ladling mechanism which has been immersed in a tank of electrolyte fluid is raised above the level of the battery to be filled. In a preferred embodiment, the tiltably adjustable ladling apparatus includes a battery casing of cellular construction similar to the battery being filled, with each chamber of the casing being connected by means of a different hose to a corresponding cell of the battery. Gravity flow from the respective chambers through the nozzles and into the corresponding cells completes the filling operation, after which the ladling mechanism is once more lowered into the tank, the nozzle assembly is raised from the battery, and the conveyor is again actuated.

It may therefore be seen that embodiments of the present invention represent substantial strides toward achievement of the foregoing general goals of battery manufacturing and filling processes. Use of a straightforward gravity feed technique obviates the problems brought on by the complicated adjustment and maintenance of pump systems. Use of a tiltable multi-chambered battery casing as a ladling means fairly approximates batteries of a wide range of volume capacities, and in any event isolates the effect of a hose crimp or blockage to the single corresponding chamber in the battery. Likewise, the multiple position template overlay for the separate nozzles enables the adjustment of those nozzles in a manner which is both quick and convenient, as well as being economical. These and other features will be illustrated more clearly in the following detailed description, taken in conjunction with the appended figures.

DESCRIPTION OF THE DRAWINGS

FIGS. 10 and 11 show assembled and partially exploded nozzle assemblies whereby batteries can be filled in accordance with the principles of the present invention; and FIG. 12 shows an exemplary timing scheme for the apparatus of FIGS. 1 through 11.

DETAILED DESCRIPTION

Figure 1:
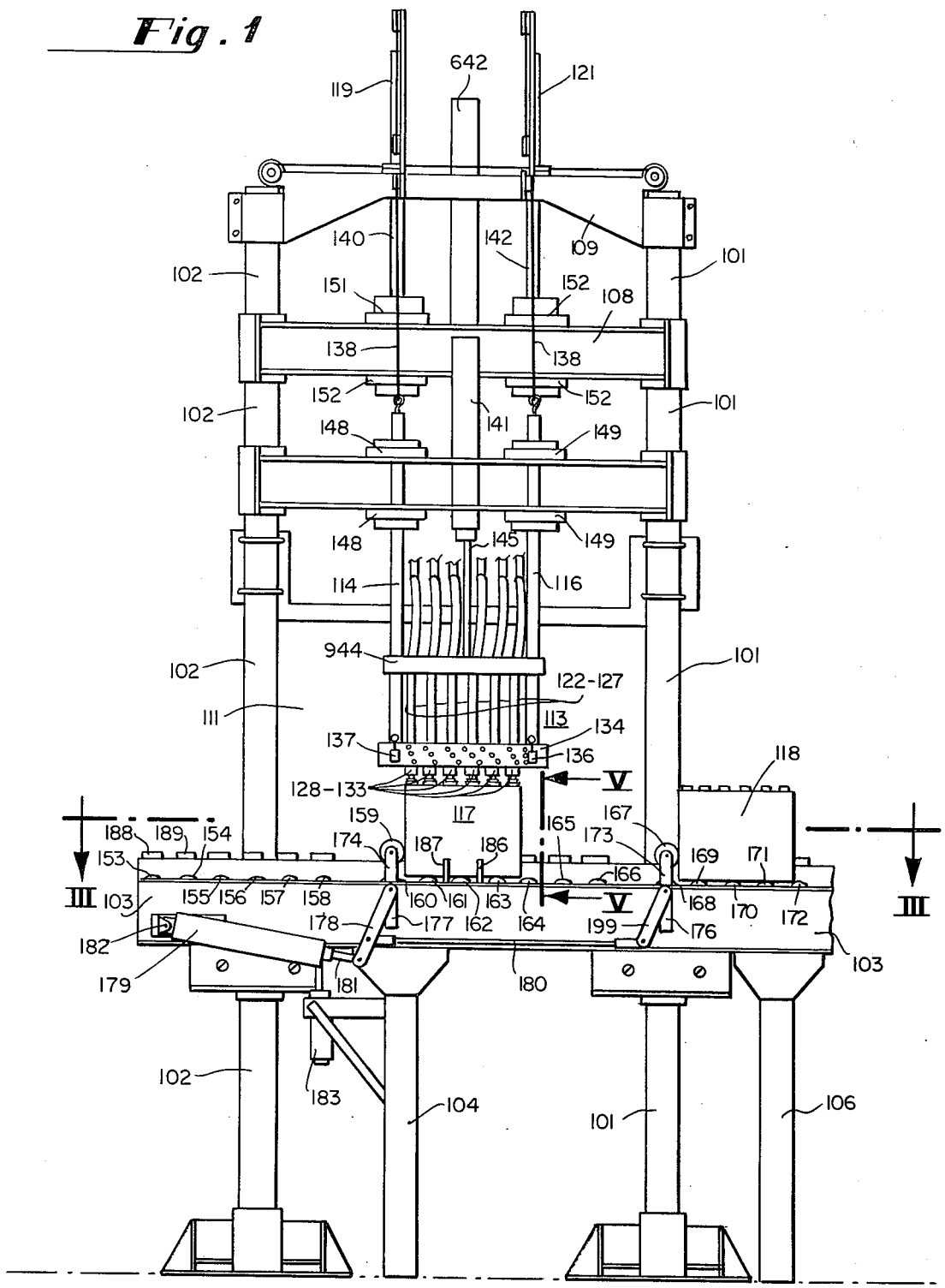
FIG. 1 shows a front view of acid filling apparatus which embodies the principles of the present invention.

The method and apparatus which embodies the principles of the present invention involves the positioning of a battery for filling, the separation of a predetermined volume of fluid for filling the battery, the delivering of that fluid through a nozzle assembly into the battery, and the subsequent delivery of the filled batteries for further processing. These fundamental features, plus several ancillary ones which insure effective operation of the principles of the present invention, are embodied in the machinery shown in two views in FIGS. 1 and 2, which machinery in turn involves the apparatus shown in greater detail in FIGS. 3 through 11.

For purposes of illustration, two batteries are shown, designated 117 and 118, which are being processed. The first battery 117 is shown in the process of being filled, and the second battery 118 is positioned such that it will be the next one to be filled. The batteries move generally along a conveyor table having side support members 100 and 103 and support legs 104, 105, 106 etc. The moving portion of the conveyor is defined by a plurality of rollers 153 through 172 over which the batteries move. The battery filling operation is conducted at a station defined by upright structural members 101 and 102 connected by transverse structural members 107, 108, and 109. Immediately behind and above the conveyor table defined by rollers 153 through 172 is a tank 111 which holds a supply of acid or other appropriate electrolyte which is to be transferred in appropriate quantities into the batteries 117, 118, etc. Attached to the lowermost transverse structural member 107 through bearings 148 and 149 is a vertically movable rack having arms 114 and 116 slidably mounted through the bearings 148 and 149 and affixed by means of a transverse structural member 944. At the bottom of the arms 114 and 116 is an assembly shown generally as 113 which includes an adjustable template 134 and a plurality of nozzles 128 through 133 adjustably connected thereto. By means of the adjustment mechanism including the nozzles 128 through 133 and the plate 134, along with other apparatus, the nozzles may be adjusted properly such that when a battery 117 is positioned for filling, the lowering of the assembly 113 causes the nozzles 128 through 133 to mate exactly with the inlet ports of the battery 117. Thereupon, fluid may be provided by means of the hoses 122 through 127 and into the battery 117.

Affixed to the uppermost transverse structural member 109 are a pair of arms 119 and 121 which support a counterweight system. Attached to the two arms 114 and 116 of the nozzle assembly 113 are lines 138 which extend through appropriate pulleys on the arms 119 and 121 and to counterweights which enable the assembly 113 to be moved upwardly and downwardly by means of the hydraulic piston and clyinder arrangement 141 and 145 to fill batteries at appropriate times. Also arrayed on the arms 119 and 121 are a counterweight system utilizing lines 139 which in turn are connected to operate the support arms 140 and 142 which in turn manipulate the apparatus for transferring electrolyte from the tank 111 to the battery such as 117.

More particularly, the middle transverse structural support member 108 has bearings 151 and 152 mounted thereon with the rods 140 and 142 extending therethrough. The lower portions of the rods 140 and 142 terminate in an adjustable mechanism including a battery shell 143, a pivotable table 144 which may be locked to a fixed member 147 by means of a set screw 145, and a template 146 which indicates the angle at which the battery 143 is locked. The hoses 122 through 127 are connected from chambers in the battery shell 143 downwardly to the nozzles 128 through 133 such that, when the battery shell is immersed in the tank 111 and is lifted therefrom by the hydraulic cylinder mechanism 642, electrolyte flows from the shell 143 downwardly through the hoses 122 through 127 and into the battery 117.

As will be disclosed hereinafter, the tilting of the support 144 for the casing 143 to a degree projected on to template 146 fixes the amount of electrolyte which is accumulated in the casing 143 and therefore which subsequently is delivered to the battery 117. Hence, adjustment of the tilt of the casing 143 serves as a convenient adaptation for the filling of batteries of arbitrary size.

Figure 2:
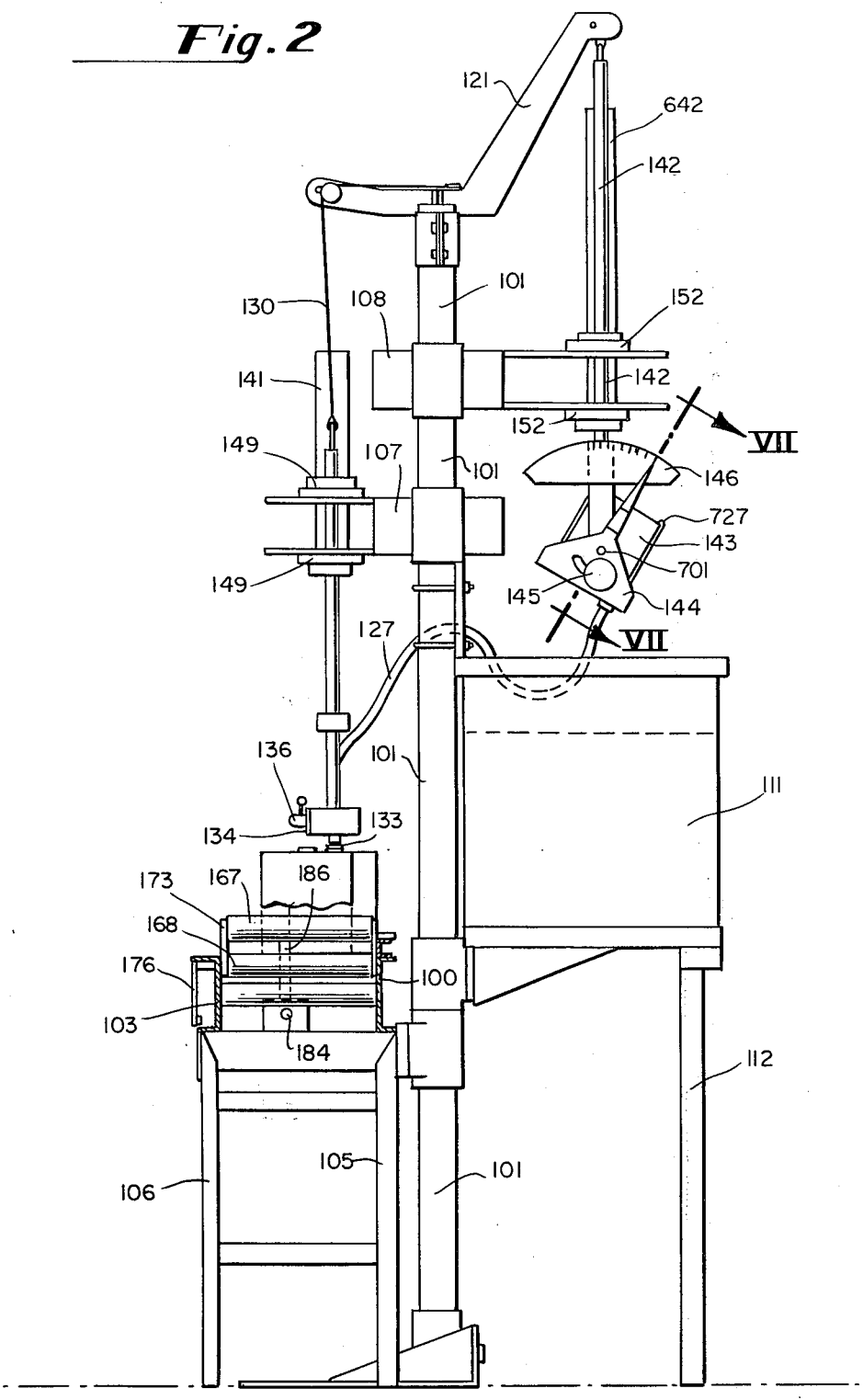
FIG. 2 shows a side view of the apparatus of FIG. 1.

The apparatus of FIGS. 1 and 2 also involves a manipulative facility for select ones of the conveyor rollers 153 through 172 whereby one battery such as 117 is placed precisely in position for filling while all others, such as 118, are prevented from interfering with the filling process. This adjustment procedure is embodied chiefly by the pivotable mounting of two of the rollers 159 and 167 over their next adjacent counterparts 160 and 168 under the control of a hydraulic cylinder 179. Also, whenever a battery such as 117 is prevented from further conveyance by the upward pivoting of roller 159, another cylinder 183 causes two clasping arms 186 and 187 to pivot upwardly between rollers 161 through 163 and secure the battery 117 against bumpers such as 301, 302, 303 etc. Thus, in sequence, the battery 117 is conveyed forwardly until it meets the upwardly pivoted roller 159, whereupon the arms 186 and 187 push it exactly into place for the nozzles 128 through 133 to be lowered downwardly and to mate with the inlet ports thereof. Whenever the filling process is completed, the arms 186 and 187 pivot downwardly, as do the rollers 159 and 167, and the batteries are further conveyed for processing.

The foregoing cursory description of the embodiment of FIGS. 1 and 2 may be more clearly understood by considering several of the component parts individually, and relating the individual performance to that of the overall apparatus.

Figure 3:
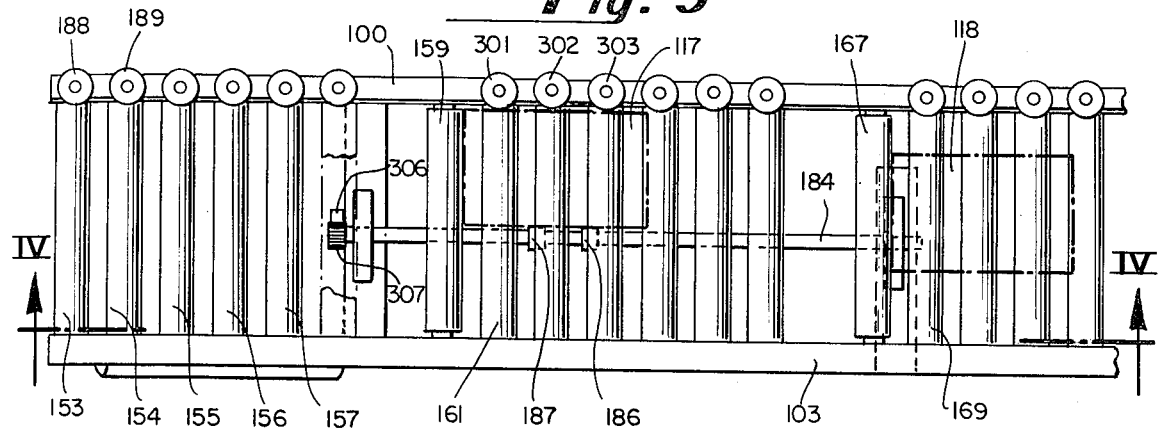
FIG. 3 shows a conveyor mechanism to deliver and position batteries for filling.
Figure 4:
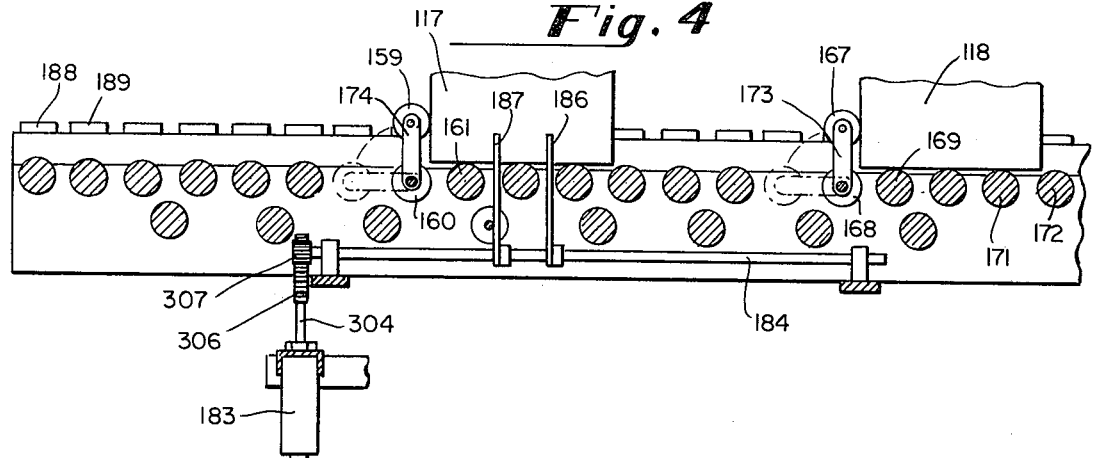
FIG. 4 shows a cutaway of the conveyor mechanism of FIG. 3.
Figure 5:
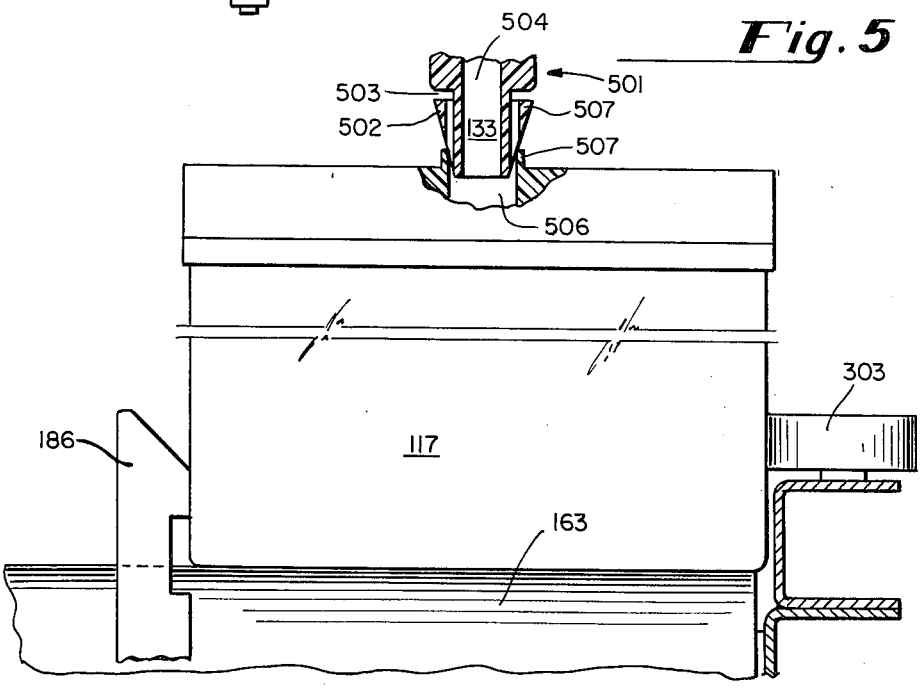
FIG. 5 shows the mating of a filler nozzle with a battery positioned on the conveyor of FIGS. 1, 2, 3, and 4.

FIGS. 3, 4 and 5 show how the conveyor table operates to position batteries such as 117 and 118 appropriately for filling. In the figures, the rollers 153 through 172 are stationary such that the batteries pass thereover being conveyed from right to left. Two of the rollers 159 and 167 are pivotally mounted by means of pivot arms 173 and 174 about their next corresponding rollers 160 and 168. Thus, when the cylinder 179 is energized to push plunger 181 outwardly, a sway bar 178 is pivoted, and by means of shaft 180, another arm 199 is moved similarly. This in turn causes the rollers 159 and 167 to move pivotally above the corresponding next rollers 160 and 168.

In a preferred embodiment, a photoelectric or other similar sensor located in the region between the first upright support member 101 and the nozzle filling assembly 113 senses the passage of a battery therebeyond and energizes the cylinder 179 to pivot rollers 159 and 167 as shown in the drawings. Thereupon, the first battery 117 is prevented from moving beyond the location of the filling assembly 113, and all other batteries such as 118 are prevented from moving into the region of the filling assembly 113 by the second pivoted roller 167.

Whenever the battery such as 117 is to the point of restraint by the roller 159 above roller 160, a second cylinder 183 is energized to retract its piston 304. By means of a rack 306 with a pinion gear 307, a shaft 184 located longitudinally beneath the rollers 153 through 172 is turned accordingly. Attached to the shaft 184 are two arms 187 and 186 which are moved upwardly, make contact with the battery 117, and push it toward the innermost lateral support member 100 of the conveyor table. Located on the top portion of member 100, however, is a series of bumpers 188, 189, 301, 302, 303, etc. The sidewise motion of the battery which then abuts roller 159 therefore places it in a fixed predetermined position below the nozzle filling assembly 113. Thereupon, the nozzle assembly 113 may be lowered over the battery 117 and the filling process may be accomplished. After a fixed, predetermined time, the battery filling procedure is completed and the cylinders 179 and 183 may be energized to turn the arms 187 and 186 downwardly below the rollers 153 through 172, and to pivot the rollers 159 and 167 back to the position shown in phantom in FIG. 4. Thereupon, the rollers 153 through 172 move the batteries onward, with the passage of battery 118 through the control circuit, not shown, once more energizing the rollers 159 and 167 to position battery 118 beneath the nozzle filling assembly 113.

It is to be understood that the above mentioned photoelectric control system, not shown, is but one of a large number of control options. Mechanical switch trip mechanisms or the like might be used with similar faciltiy, and likewise being integrated with the other control and timing apparatus to achieve orderly, coherent operation.

Figure 6:
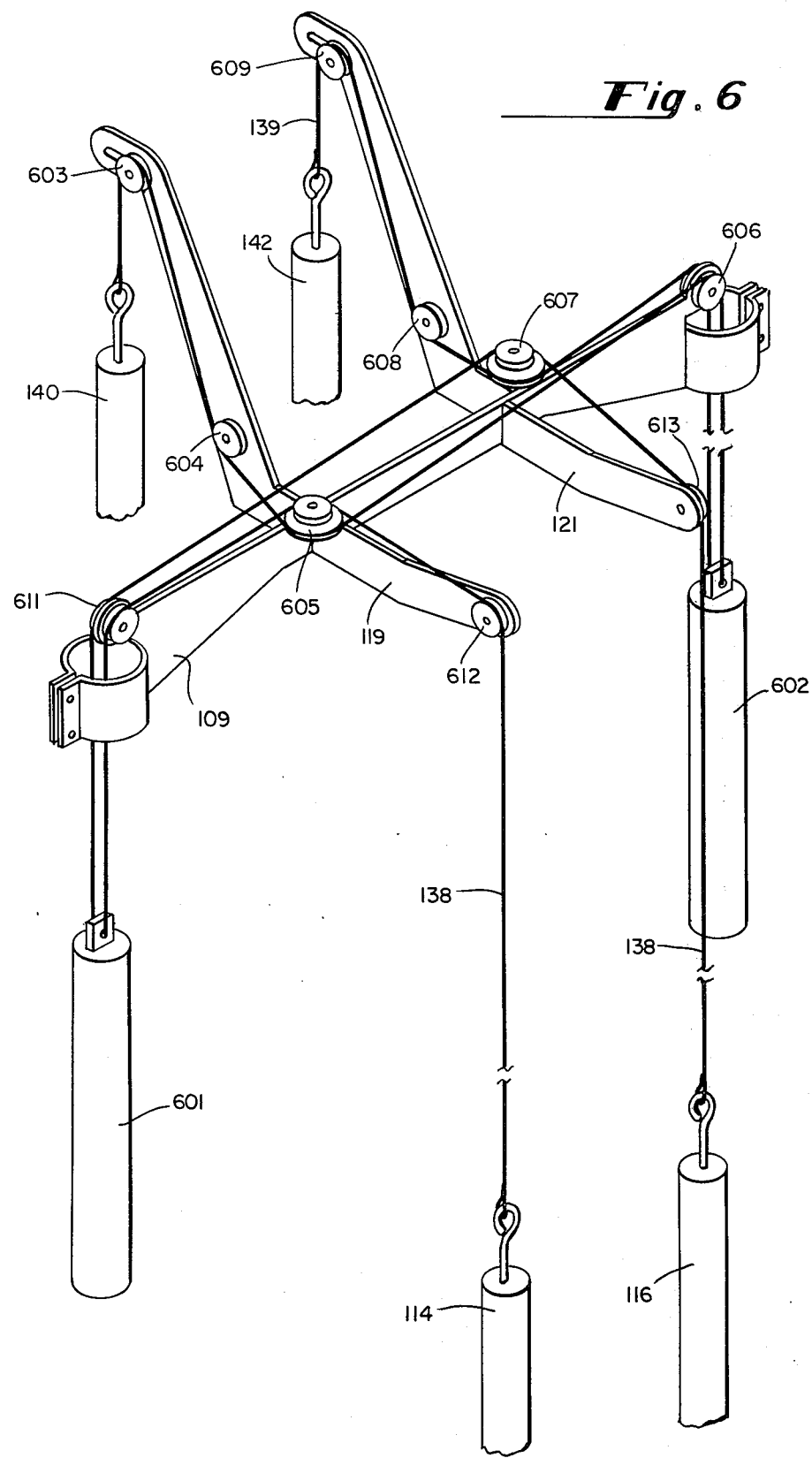
FIG. 6 shows a system of counterweights which facilitates operation of the embodiment of FIGS. 1 and 2.

FIG. 6 shows a counterweighting scheme whereby the nozzle filling assembly 113 and the ladling system 143 may be easily and efficiently operated. The lines 138 and 139 by which the respective movable assemblies are mounted run over a plurality of pulleys 603 through 613 as shown to utilize the counterbalancing effect of a pair of weights 601 and 602 which preferably are mounted within the upright structural members 101 and 102 of the machine. More particularly, structural arms 114 and 116 of the filling assembly 113 are countered by weight 601. More particularly, line 138 which connects arms 114 and 116 passes over pulleys 612, 605, 611, through the upward portion of weight 601, and back over pulleys 611, 607, and 613. Similarly, the ladling system including casing 143 is countered by weight 602, whereby line 139 is connected over pulleys 603, 604, 605, and 606, through the top of the weight 602, and back up over pulleys 606, 607, 608, and 609. Therefore, weight 601 moves up and down in the opposite direction of the filling assembly 113, and weight 602 moves similarly relative to the ladling assembly including casing 143.

Figure 7:
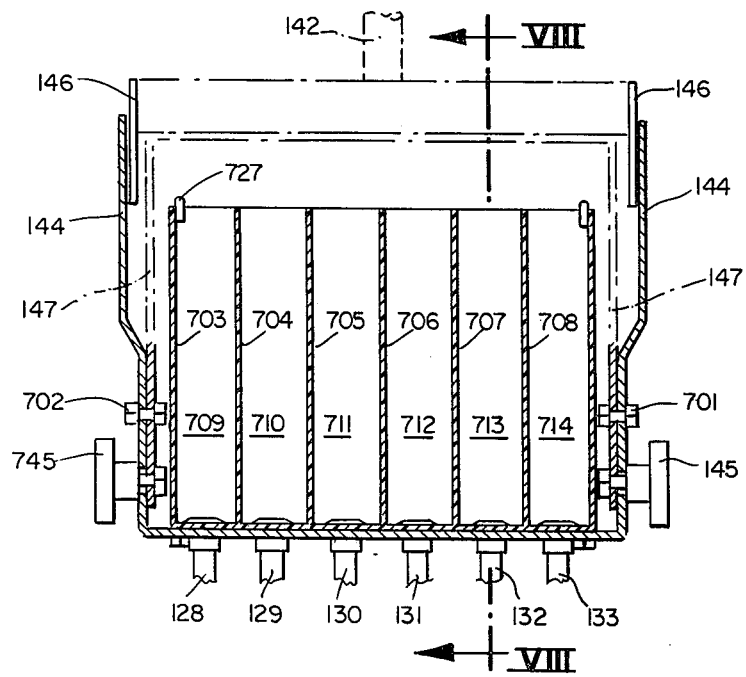
FIGS. 7, 8, and 9 show various views of a ladling system whereby fluid is taken from a tank and subsequently is dumped into a battery.
Figure 9:
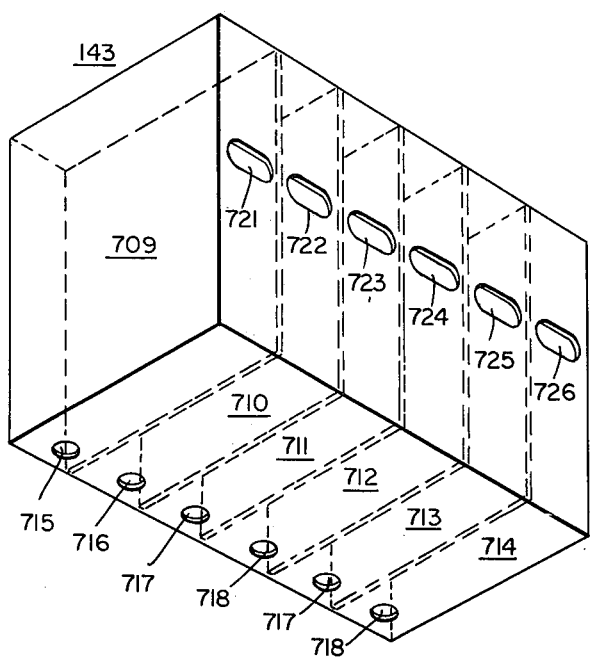
Figure 8:
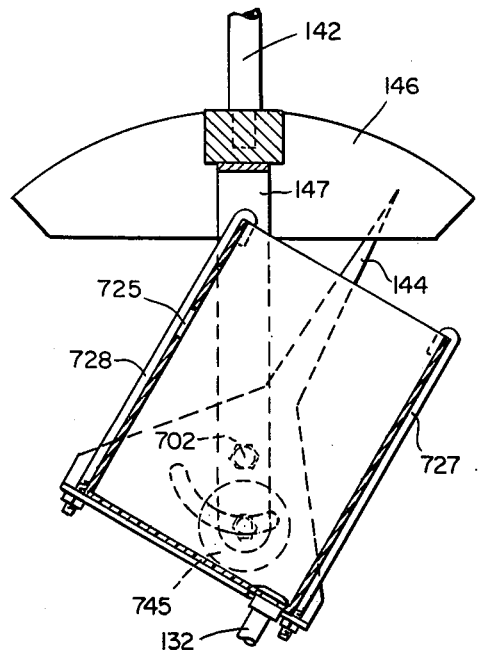

The apparatus whereby fluid is taken from the tank 111 and coupled by means of gravity flow into the battery such as 117 through the hoses 122 through 127 and nozzles 128 through 133 is shown in detail and in cross-section in FIGS. 7 through 9. More particularly, FIGS. 7 and 9 represent cutaways as shown, and FIG. 9 illustrates the construction of the casing 143 which is used as a ladle.

As was discussed hereinbefore, one of the outstanding features of the apparatus embodying the principles of the present invention is its adaptability to process batteries of varying size and structural characteristics with only minor alteration of the processing machinery. As may be seen from the figures, the ladling mechanism involves a casing 143 which is mounted by means of brackets 727 and 728 onto a pivotable table 144. In addition to serving the basic support structure for the casing 143, the table 144 is configured to define pointers at either end which, when the table 144 is pivotally connected to the fixed member 147, overlay the templates 146.

The casing 143 which is shown is designed to process batteries having six internal chambers and having volume dimensions generally the same as that of the casing 143. The casing 143 defines outlets 715 through 720 on its bottom surface near one sidewall, which outlets vent corresponding ones of the chambers 709 through 714 into the hoses 128 through 133. Thus, as the casing 143 is fixed on the level or is tilted in the direction of the side nearest the outlets 715 through 720, fluid in the chambers 709 through 714 will be permitted to flow through corresponding hoses 128 through 133, respectively. The wall of the casing 143 opposite the one nearest the openings 715 through 720 also defines a plurality of overflow ports 721 through 726, one overflow port being provided for each of the chambers 709 through 714. The ports 721 through 726 serve the function of limiting the amount of fluid which will be taken from the tank 111 and coupled into the battery such as 117 through the hoses 128 through 133. Clearly, depending upon the degree of tilt at which the table 144 is fixed relative to the vertical, a different fluid level within the respective chambers 709 through 714 will be achieved, with the lower edge of the overflow ports 721 through 726 and the upper edge of the wall opposite the ports 721 through 726 forming the extremes for the fluid level within the casing 143. Of course, gradations in the tilt of the table 144 and of the casing 143 will correspondinly alter the amount of fluid retained in the chambers 709 through 714.

The table 144 is attached to the fixed structural member 147, and, in turn to the support rods 140 and 142 by means of pivot pins 701 and 702. Also, a pair of adjustment knobs 145 and 745 penetrate both the table 144 and member 147, the former opening being configured as an elongated arc which permits the table 144 to be rotated about the pivot points 701 and 702. Correspondingly, such pivoting of the casing 143 and table 144 alters the position of the pointer extensions of the table 144 which overlay the template 146. Inscribed on the template 146 are markings corresponding to the various angles defined by the table 144 relative to the fixed vertical member 147. Furthermore, each such position of the table 144 corresponds to a different fluid volume retainable within the chambers 709 through 714. The combined apparatus of FIGS. 7 through 9 may therefore be utilized to select a volume of fluid desired to be coupled to the batteries such as 117. Once such volume is determined, and the pointer extension of table 144 is moved to the desired corresponding position on the template 146, the knobs 145 and 745 may be tightened to lock the casing 143 and the table 144 in that position. Thereupon, each time the apparatus is lowered into and withdrawn from the tank 111, the same predetermined amount of fluid always will be taken.

It will therefore be apparent that the apparatus of FIGS. 7 through 9 provides extensive adaptability with minimal inconvenience. For most applications, the tilt variation of the casing 143 and the concomitant variation of fluid in the chambers 709 through 714 will provide ample adaptability to fill batteries of varying volume. In the case in which batteries much larger or much smaller than the casing 143 must be filled, a brief unfastening of the brackets 727, 728, and the like, and a replacement of the casing on table 144 will be all that is required. This is in marked contrast to many prior art systems, which, by utilizing pumps, require much more complex and yet less accurate adjustment in order to change the amount of volume transferred from a tank such as 111 to a battery such as 117.

It will also be apparent that the isolation of each of the chambers 709 through 714 in the casing 143, in direct correspondence to individual chambers in the battery, minimizes the possibility that any given cell will either be overfilled or underfilled. That is, in many prior art systems, all of the delivery hoses such as 128 through 133 are fed either by a single pump or by single chambered containers. In such systems, if a crimp occurs in one of the hoses, or if the pump operation is impeded or altered, corresponding overfill or underfill of the battery will result.

It is to be understood that the six chambered casing 143 is submitted as an exemplary embodiment of six celled batteries. It is of course well within the purview of those skilled in the art to vary the internal construction of the casing 143 in order to accomodate similarly variant batteries. Likewise, the relative positioning of the outlets 715 through 720 and of the overflow ports 721 through 726 is a design option to be manipulated as necessary for different sorts of battery filling operations.

Another of the extensive adaptability features embodied in the apparatus of the principles of the present invention may be seen from consideration of the acid filling assembly 113, shown generally in FIGS. 1 and 2 and in greater detail in FIGS 5, 10 and 11. Generally, the assembly 113 includes nozzles 128 through 133 which are connected to the hoses 122 through 127 through respective corresponding mounting blocks 936 through 941. The blocks 936 through 941 are slidably mounted on a pair of rods 901 and 902 which are rigidly connected at either end to a pair of terminating blocks 934 and 935. The terminating blocks 934 and 935 in turn are respectively connected to the support arms 114 and 116 of the assembly 113. Thus, raising or lowering of the arms 114 and 116 and therefore of the assembly 113 by means of the cylinder and plunger arrangement 141 and 145 correspondingly raises or lowers the nozzles 128 through 133 in unison. Therefore, whether the nozzles are positioned above the battery filling station antecedent to coupling with the battery, or alternatively whether they are lowered such as shown in FIGS. 1 and 2 to mate with the battery inlet ports and couple electrolyte fluid thereto depends upon the operation of the cylinder and plunger mechanism 141 and 145 in conjunction with counterweight 601 of the counterweighting system shown in FIG. 6.

The lateral position of the nozzles 128 through 133 is established by the overlayment of a template 134 which is mounted on the terminating blocks 934 and 935 and which is penetrated by predetermined sets of holes to accomodate protuberances from each of the support blocks 936 through 941. More particularly, it may be seen in FIG. 10 that each of the blocks 936 through 941 includes a protuberance 928 through 933 at substantially identical locations on the front faces thereof. Each of these protuberances 928 through 933 is designed to fit in any of the holes which penetrate the template 134. Accordingly, the positioning of the template relative to the end locks 934 and 935 establishes a fixed predetermined set of positions for the blocks 936 through 941 and therefore for the nozzles 128 through 133, because positioning of the template 134 requires the blocks 936 through 941 to be positioned such that the respective protuberances 928 through 933 mate with various ones of the holes in the template 134 to accommodate different sized batteries, or batteries of different numbers of cells, or of different sized cells, for example.

More specifically, the template 134 is penetrated at either end by elongated openings 949 and 951 through which the template is attached to the terminating blocks 934 and 935. This attachment is accomplished by securement elements 137 and 136, which respectively have cam and screw elements 942 and 943 to lock into blocks 934 and 935 in opposition to the force of a pair of springs 904 and 903. The screw elements actually secure a cam device which only requires upward or downward movement to loosen the template for adjustment. The blocks 934 and 935 each include protuberances 947 and 948, however, which respectively fit into one of the openings of the sets of holes 952 and 959 in the template 134. Thus, although the securement means 136 and 137 have a vertical movement range defined by the elongated openings 949 and 951, the positioning of the protuberances 947 and 948 is limited to the location of the sets of openings 952 and 959. Once such positioning is established, corresponding positioning of the other sets of openings 953 through 958 in the template 134 are established for the protuberances 928 through 933 of the blocks 936 through 941. It may therefore be seen that, in the overall assembly such as shown in FIGS. 1, 2, and 11, the lateral position of the nozzles 128 through 133 is established by the positioning of the blocks 936 through 941 relative to the openings in the template 134.

In a preferred embodiment, the nozzles 128–133 are slidably mounted within the blocks 936–941 to operate a pressure sensitive timing and control actuator. That is, the downward movement of the nozzles 128–133 to mate with inlet ports of the battery 117 may be utilized as an actuation stimulus for other operations. Hence, if the nozzles 128–133, upon meeting the battery 117 and being compressed upward within the blocks 936–941 actuate a pressure sensitive switch, various timing operations (e.g. various ones of the waveforms of FIGS. 12(A) through 12(H)) may be commenced, and later terminated, and select ones of the drive cylinders such as 642 may be driven against the almost balanced counterweight system of FIG. 6. In preferred embodiments, control is also provided for the eventuality of a false signal, wherein the head comes down with no battery present. The mechanism, upon not finding a battery, will automatically abort the remaining portion of a cylce, preventing the operation of the ladle mechanism.

An additional feature of the counterweight system is to insure that in the event of power failure, loss of pneumatic or hydraulic pressure, or other such control malfunctions, the fill head and ladle will assume position which avoids spillage of corrosive acid on conveyor or personnel.

One feature of the ladle design is, by the inclusion of the overflow ports, the beginning of the ladle movement causes overflow to take place prior to reaching gravity flow height. It is therefore unnecessary to maintain constant or accurate levels in the supply tank 111.

It is to be understood that the protuberance with template arrangement shown in FIGS. 10 and 11 is not restricted in terms of utility to battery filling apparatus. Rather, many aspects of the battery manufacturing process utilize machinery which is repeatedly coupled to specific parts of batteries, withdrawn therefrom, and so on. Weldment of battery posts is one such example. Therefore, the free adaptability afforded by the template overlayment such as shown in FIG. 10 would be quite useful and effective in conjunction with all such processes. It is also to be understood that the locations of the openings 952 through 959 on the template, with consequent alteration of the lateral position of the nozzles 128 through 133 is a freely variable design option, depending upon the characteristics of the process utilized.

One further feature of the nozzle arrangement utilized in accordance with the principles of the present invention may be seen from FIG. 5. That drawing shows one of the nozzles 133 in its mating position over a cell inlet port 506 of the battery 117. As shown, the nozzle includes an opening 504 which communicates with the corresponding feed hose and which is defined by the principal structural element 501. The lower portion of the nozzle 133 is tapered to mate properly with variably sized inlet ports of the battery cells. Additionally, however, the tapered portion 502 of the nozzle 133 is penetrated in one or more places such as 503 in order to vent the cell while it is being filled, such that the free flow of electrolyte down into the cell will not be impeded.

The foregoing discussion of the apparatus of FIGS. 10 and 11 has demonstrated many of the structural features of the present invention. From a consideration of that apparatus in conjunction with the waveforms of FIG. 12, an exemplary mode of operation may be seen. In FIG. 12, the abscissa read from left to right represents passage of time. The ordinate values of each of the waveforms are binary, with the two levels generally represented in accordance with the following.

Prior to the entry of any battery down the conveyor, beyond the first structural member 101 and into the control system, not shown, the acid filling assembly 113 is assumed to be raised upwardly above the eventual position for battery filling, and the ladling apparatus including the casing 143 is immersed in the tank 111. The entry of the battery into the filling range and its presence therein is represented by the upward portion of the FIG. 12(A) waveform. As is shown in FIG. 12b, whenever the battery does enter the critical region and triggers the control mechanism, the stop gate represented by the upward pivoting cylinder and piston arrangement 179 and 181 is activated to pivot rollers 159 and 167 upwardly as detailed hereinbefore. After allowing sufficient time for the battery such as 117 to come to rest against the upwardly pivoted roller 159, two processes occur. First, as is shown in waveform FIG. 12(D), cylinder 183 is energized and the arms 187 and 186 pivot upwardly to secure the battery such as 117 against the rear bumpers 301 through 303. Simultantously, a timed process begins which controls the subsequent positioning of the filling assembly 113 and the ladling assembly including the casing 143. The automatic timing operation is shown in the waveform of FIG. 12(C).

Once sufficient time is allowed for the arms 187 and 186 to clamp the battery in its proper position, the filling assembly 113 is lowered to the position shown in FIGS. 1 and 2 by the energizing of the cylinder 141 and its corresponding piston 145. The lowering of the filling heads 113 is shown in the waveform of FIG. 12(E). Once the nozzles 128 through 133 are positioned matingly with the battery, the ladling mechanism including casing 143 is raised in accordance with the waveform of FIG. 12(F). This lifting of the casing 143 permits the electrolyte to flow downwardly from the casing, through the hoses 122 through 127 and into the various battery cells. A timing process such as shown in FIG. 12(G) insures that the electrolyte will be allowed sufficient time for a gravity flow into the battery 117. At this point, as indicated in the timing waveforms of FIGS. 12(C) and 12(G), all relevant procedures are completed and the battery, now filled, may be moved along the conveyor system for further processing. Consequently, the filling head assembly 113 may be raised from position, the ladling assembly may be lowered once more into the tank 111, the cylinders 179 and 183 may be energized to retract the arms 187 and 186 and to pivot the stop gates 159 and 167 downwardly, and thereby to permit movement of the battery down the conveyor. As is shown in FIG. 12(H), a counter may be energized by the signal pulse shown to indicate the number of batteries thus processed. Thereupon, the apparatus remains prepared for entry and processing of the next battery, such as 118.

It is to be understood that the foregoing suggested process and apparatus as exemplified the figures are intended to be illustrative of a preferred mode of operation, but that many options readily will occur to those skilled in the art without departure from the spirit or the scope of the principles of the present invention. For example, the interrelationship of the timing waveforms of FIGS. 12(A) through 12(H) may be extensively varied so long as they insure that the nozzles are properly positioned when electrolyte is permitted to flow from the casing 143 through the hoses 122-127.

In the foregoing discussion, little mention has been made of control and timing apparatus. It will be appreciated that many such systems, well tailored to the particular control sequences and processing rates desired, are commercially available and well known in the art. Similarly, the actuation apparatus including the various cylinder and piston combinations 179 and 181, 141 and 145, 183 and 304, and 642 and 641 may be any of the hydraulic pneumatic, or other such well known machinery.

I claim:
1. Apparatus for depositing preselected amounts of fluid into each of a plurality of cells of a storage battery; comprising:
   a. a supply tank for containing fluid;
   b. ladling means mounted for periodic reciprocal movement between first and second positions, said ladling means being immersed in said tank for collecting fluid from said tank in said first position and being raised from said tank in said second position;
   c. means disposed within said ladling means for dividing said fluid from said tank into a plurality of preselected amounts, one for each cell of said storage battery, upon movement of said ladling means from said first to said second position; and
   d. fluid transfer means for periodically emptying said ladle means and for allowing the independent gravitationally induced transfer of each of said plurality of preselected amounts of fluid into each of said plurality of cells as said ladling means moves to said second position.

2. Apparatus as described in claim 1 wherein said ladling means has independent chambers corresponding respectively to each separate cell in said battery.

3. Apparatus as described in claim 2 wherein said means for transferring includes:
   a plurality of nozzles movable to overlay said battery, said nozzles corresponding respectively to each separate cell in said battery and being configured to mate with inlet ports for said cells;
   and a plurality of conduits for connecting said nozzles with associated chambers in said ladling means.

4. Apparatus as described in claim 2 and further including means for preselecting said amounts of fluid by tilting said ladling means to any of a variety of predetermined angles, whereby overflow of fluid from said ladling means caused by said tilting correspondingly varies the fluid content of said ladling means and consequently the amount of fluid deposited in said battery.

5. Apparatus as described in claim 4 wherein said means for tilting includes:
   a fixed scale template; and pointer means connected to said ladling means and pivotable to overlay said template, thereby indicating the degree of tilt of said ladling means.

6. Apparatus as described in claim 1 further comprising a conveyor surface defined by a plurality of transverse roller means mounted on longitudinal frame members, select ones of said rollers located at predetermined positions being pivotally connected about respectively adjacent ones of said rollers, and means for pivoting said select ones of said rollers upwardly and above said respectively adjacent ones of said rollers, whereby longitudinal movement of a battery along said rollers is halted by upwardly pivoted rollers at a battery filling position, and wherein said fluid transfer means further comprises a plurality of nozzles vertically movable above said battery filling position, and wherein said select ones of said rollers are disposed to prevent upon pivoting of said rollers more than a single battery at a time from being located simultaneously at said filling position, said pivotable rollers being energized after one battery has arrived between a predetermined position immediately before said filling position, and said filling position.

7. Apparatus as described in claim 6 further comprising means connected to at least one of said longitudinal frame members for limiting transverse movement of batteries on said rollers in the direction of one of said longitudinal frame members, rotatable longitudinal shaft means having at least one radially connected protuberance located thereon, rotation of said shaft means causing said protuberance to force a battery located at said filling position against said means for limiting transverse movement, said shaft means being rotatable to secure a battery under said nozzle means between an upwardly pivoted roller, said means for limiting transverse movement, and at least one of said protuberances.

8. A mechanism as described in claim 3 wherein said nozzle means include a plurality of downwardly tapered elements respectively matable with inlet ports of said batteries, said elements each defining at least one air escape notch allowing the interior of said batteries to communicate with the ambient atmosphere during the filling process.

9. Apparatus as described in claim 1 further comprising a fixed structural frame; a nozzle assembly vertically moveable on said frame, said assembly being positioned above batteries to be filled; a ladling assembly vertically moveable relative to said frame; and first and second counterweights pulley mounted to said frame for counterbalancing, respectively, the vertical movement of said assemblies.

10. An apparatus as described in claim 9 wherein said nozzle assembly includes at least one pressure sensitive switch actuated by contact of portions of said nozzle assembly with said batteries.

11. An apparatus as described in claim 10 wherein the actuation of said switch by the lowering of said nozzle assembly energizes the upward movement of said ladling assembly.

12. Apparatus as described in claim 1 wherein said means connecting said ladling means to said battery for transferring fluid therebetween further comprises a processing assembly moveable towards batteries being processed and having at least one pressure sensitive switch actuated by contact of a portion of said assembly with said batteries.

13. An apparatus as described in claim 12 wherein said processing assembly includes an acid filling nozzle assembly.

14. An apparatus as described in claim 12 and further including a weight, pulley connected to said assembly, for counterbalancing movement of said assembly.

15. A method of depositing a predetermined amount of fluid from a supply tank into a battery having a plurality of inlet ports utilizing an apparatus having a ladle with at least one outlet, said ladle being immersible in said supply tank to collect fluid from said supply tank in said ladle, comprising the steps of:

positioning said battery at a predetermined location; connecting inlet ports of said battery to outlet of said ladle; withdrawing said predetermined amount of fluid from said tank in said ladle; and elevating said ladle to a point higher than said predetermined location whereby gravity flow transfers said predetermined amount of fluid from said ladle to said battery.

16. A method as described in claim 15 and further including varying said predetermined amount of fluid by varying the orientation of said ladling means to cause controlled overflow of fluid from said ladling means back into said tank.

17. A method as described in claim 15 wherein said outlet includes a plurality of nozzles and wherein said connecting step includes: lowering nozzles communicating with said ladle to mate with inlet ports of said battery prior to elevation of said ladle; and withdrawing said nozzles from said battery after said predetermined amount of fluid is deposited in said battery.

18. A method as described in claim 15 wherein said withdrawing step includes dividing said predetermined amount of fluid into parcels respectively corresponding to the desired fluid content of associated cells in said battery, and wherein said elevating step includes delivering said parcels individually to associated cells in said battery.

* * * * *